US005344857A

United States Patent [19]

Umezawa et al.

[11] Patent Number: 5,344,857
[45] Date of Patent: Sep. 6, 1994

[54] CURING AGENT-FREE WATER BASED COATING COMPOSITION

[75] Inventors: Mituo Umezawa; Masashi Nakamura; Hirosi Kubota, all of Tokyo, Japan

[73] Assignee: Toyo Ink Manufacturing Co., Ltd., Tokyo, Japan

[21] Appl. No.: 911,933

[22] Filed: Jul. 10, 1992

[30] Foreign Application Priority Data

Jul. 19, 1991 [JP] Japan ................. 3-203465

[51] Int. Cl.$^5$ ................. C08K 3/20; C09D 167/00
[52] U.S. Cl. ................. 523/409; 523/412; 524/437; 524/441; 524/443; 524/449
[58] Field of Search ................. 523/409, 412; 524/437, 524/441, 443, 449

[56] References Cited

U.S. PATENT DOCUMENTS 4,997,865  3/1991  Scherping et al. ................. 523/409

FOREIGN PATENT DOCUMENTS 0435402  3/1991  European Pat. Off. ............ 523/409
1132667  8/1989  Japan ................. 523/409

Primary Examiner—John Kight, III
Assistant Examiner—Richard Jones
Attorney, Agent, or Firm—Wenderoth, Lind & Ponack

[57] ABSTRACT

A water based coating composition which has excellent shelf stability and can be cured by ordinary baking in the absence of a sulfonic acid-containing acid catalyst and which gives a coating having excellent adhesion and excellent water resistance. The water based coating composition can be obtained by dissolving or dispersing 50 to 80% by weight, as a solid content, of a water-soluble polyester resin prepared by polycondensing a carboxylic acid component containing 10 to 60 mol % of a polycarboxylic acid having 3 to 4 carboxyl groups per molecule and 40 to 90 mol % of a dicarboxylic acid and 1.1 to 2.0 mol, per mole of the carboxylic acid component, of a glycol component, to obtain a polyester resin having a free carboxyl group, and dissolving the polyester resin in water in the presence of a base, 5 to 20% by weight, as a solid content, of a water based bisphenol type epoxy resin, and 15 to 45% by weight, as a solid content of an alkyl-etherified amino resin, in an aqueous medium.

6 Claims, No Drawings

CURING AGENT-FREE WATER BASED COATING COMPOSITION

FIELD OF THE INVENTION

The present invention relates to a thermosetting water based coating composition to be applied to outer surfaces of food cans and beverage cans. More specifically, it relates to a water based coating composition which can be cured for a short period of time in the absence of a catalyst, whose exhaust gas contains little offensive odor and a reduced amount of formaldehyde and which gives a coating excellent in water resistance, hardness and adhesion.

PRIOR ART

Outer surfaces of food cans and beverage cans are coated with coating compositions to prevent corrosion of can materials and enhance aesthetical product value.

The coating on a can is conventionally formed by applying a solution of an acryl/amino resin or a polyester/amino resin in an organic solvent to a can material with a roll coaster, and curing the resultant coating by baking it in a gas oven. However, these coating compositions dissipate a large amount of a solvent when baked, and cause air pollution. These coating compositions are also undesirable in view of resource saving. It has been therefore desired to develop a water based coating composition which can overcome these problems.

The above conventional water based acrylic coating composition and water based polyester coating composition contains, as an amino resin component, an amino resin having a completely alkyl-etherified methylol group to reduce the formaldehyde amount in an exhaust gas at the time of baking. However, the amino resin having a completely alkyl-etherified methylol group is required to have a sulfonic acid-containing acid catalyst present in combination due to its reaction mechanism. That is, the above conventional water based coating compositions cannot be cured by ordinary baking without such an acid catalyst. On the other hand, they can be cured by ordinary baking if an acid catalyst is present in combination. However, the problem is that the acid catalyst remains in a formed coating, and decreases the water resistance of the coating since it is of hydrophilic nature per se. Further, the acid catalyst also causes a problem in that the coating composition is thickened with time and that the acid catalyst adsorbs pigment to show a decreased catalytic effect when the coating composition contains the pigment.

SUMMARY OF THE INVENTION

It is an object of the present invention provide a water based coating composition which can be cured for a short period of time in the absence of a catalyst and which gives a coating excellent in water resistance, hardness and adhesion.

It is another object of the present invention to provide a water based coating composition having excellent shelf stability.

It is further another object of the present invention to provide a water based coating composition whose exhaust gas contains little offensive odor and a reduced amount of formaldehyde.

According to the present invention, there is provided a curing catalyst-free water based coating composition obtained by dissolving or dispersing 50 to 80% by weight, as a solid content, of a water-soluble polyester resin prepared by polycondensing a carboxylic acid component containing 10 to 60 mol % of polycarboxylic acid having 3 to 4 carboxyl groups per molecule and 40 to 90 mol % of a dicarboxylic acid and 1.1 to 2.0 mol, per mole of the carboxylic acid component, of glycol component, to obtain a polyester resin having a free carboxyl group, and dissolving the polyester resin in water in the presence of a base, 5 to 20% by weight, as a solid content, of a water based bisphenol type epoxy resin, and 15 to 45% by weight, as a solid content, of an alkyl-etherified amino resin, in an aqueous medium.

DETAILED DESCRIPTION OF THE INVENTION

The polyester resin having a free carboxyl group, used in the present invention, is prepared by polycondensing a carboxylic acid component containing 10 to 60 mol % of a polycarboxylic acid having 3 to 4 carboxyl groups per molecule and 40 to 90 mol % of a dicarboxylic acid and 2.0 mol, per mole of the carboxylic acid component, of a glycol component. The above carboxylic acid component is required to contain 10 to 60 mol % of a polycarboxylic acid having 3 to 4 carboxl groups per molecule. When the amount of the polycarboxylic acid having 3 to 4 carboxyl groups per molecule is less than 10 mol %, the resultant coating composition cannot be sufficiently cured. When this amount exceeds 60 mol %, a crosslinking reaction advances to excess, and interlayer adhesion strength is poor when the coating composition is applied on a coating formed from the coating composition.

The above polycarboxylic acid includes tribasic and tetrabasic acids such as trimellitic anhydride, methylcyclohexenetricarboxylic arthydride, pyromellitic anhydride and maleated methylcyclohexene tetrabasic acid anhydride.

The dicarboxylic acid includes dibasic acids such as phthalic acid, phthalic anhydride, isophthalic acid, terephthalic acid, succinic acid. succinic anhydride, adipic acid, azelaic acid, sebacic acid, tetrahydrophthalic acid, tetrahydrophthalic anhydride, hexahydrophthalic acid, hexahydrophthalic anhydride, Himic acid, anhydrous Himic acid, maleic acid and maleic anhydride.

The glycol component includes dihydric alcohols such as ethylene glycol, propylene glycol, 1,4-butanediol 1,6-hexanediol, diethylene glycol, dipropylene glycol neopentyl glycol and triethylene glycol, and alcohols having 3 or more hydroxyl groups such as-trimethylolethane, trimethylolpropane, trishydroxymethylaminomethane, pentaerythritol, dipentaerythritol and diglycerin.

The weight average molecular weight of the polyester resin obtained by reacting the above polycarboxylic acid, the above dicarboxylic acid and the above glycol component is preferably 1,000 to 15,000, preferably 2,000 to 10,000. When this weight average molecular weight is less than 1,000, a coating formed from the resultant water based coating composition shows poor physical properties. When it exceeds 15,000, the workability of the resultant coating composition is poor.

The polyester resin having a free carboxyl group is made water-soluble by neutralizing it with a base. The base is selected from ammonia, methylamine, dimethylamine, ethylamine, diethylamine, triethylamine, dimethylethanolamine, diethanolamine and triethanolamine. The base is used in such an amount that the carboxylic acid of the polyester resin is at least partially neutralized.

The water based bisphenol type epoxy resin is a resin which is soluble or dispersible in an aqueous medium in the presence of a base and which is obtained by adding a polycarboxylic acid such as (anhydrous) phthalic acid, isophthalic acid, terephthalic acid, adipic acid, (anhydrous) tetrahydrophthalic acid, intoconic acid, (anhydrous) trimellitic acid or (anhydrous) pyromellitic acid to a hisphenol type epoxy resin such as bisphenol A diglycidyl ether, bisphenol A di-$\beta$-methyl-diglycidyl ether or diglycidyl ether of an adduct of hisphenol A with alkylene oxide. The water based bisphenol type epoxy resin preferably has a number average molecular weight of 500 to 5,000. The water based bisphenol type epoxy resin in a coating works as a component for adhesion. The amount, as a solid content, of the water based bisphenol type epoxy resin is 5 to 20% by weight. When this amount is less than 5% by weight, it hardly works as a component for adhesion. When it exceeds 20% by weight, the catalytic effect of the polyester resin used in the present invention decreases.

The alkyl-etherified amino resin is a product obtained by substantially completely alkyl-etherifying the methylol groups added to a melamine resin or a benzoguanamine resin. For example, six methylol groups in a melamine resin, and four methylol groups in a benzoguanamine resin, are completely alkyl-etherified with an alcohol. The alcohol is selected from alcohols such as methanol, ethanol, isopropanol, n-butanol and isobutanol, and cellosolves such as methyl cellosolve, ethyl cellosolve and butyl cellosolve. The alkyl-etherified amino resin is used as a crossinking agent. The amount, as a solid content, of the alkyl-etherified amino resin for use is 15 to 45% by weight. When this amount is less than 15% by weight, the crosslinking efficiency is too small to give a coating having sufficient hardness and sufficient water resistance. When it exceeds 45% by weight, the resultant coating undesirably shows poor flexibility.

When there is used an amino resin having methylol groups which are not completely alkyl-etherified, it is general practice to add a sulfonic acid-containing acid catalyst in order to cure the coating composition for a short period of time or at a low temperature. Even if a coating composition contains an amino resin having a methylol groups which are not completely alkyl-etherified, the coating composition can be cured at a low temperature for a short period of time by incorporating the above polyester resin having a free carboxyl group. The water based coating composition of the present invention may contain a sulfonic acid-containing acid catalyst. The sulfonic acid-containing acid catalyst is selected from p-toluenesulfonic acid, dodecylbenzenesulfonic acid, dinonylnaphthalenedisulfonic acid and products prepared by blocking these acids with amine.

The water based coating composition of the present invention is obtained by dissolving or dispersing the above resin components in an aqueous medium. The aqueous medium contains water and not more than 20% by weight, preferably not more than 15% by weight, per 100% by weight of water, of a hydrophilic organic solvent. The organic solvent is selected from cellosolves such as methyl. cellosolve, ethyl cellosolve and butyl cellosolve and alcohols such as methanol and ethanol.

The water based coating composition of the present invention may contain a variety of inorganic pigments and organic pigments, and additives such as an antifoamer, a lubricant and a leveling agent as required. It may also contain conventionally known polyester and acrylic resins. Further, it may also contain a partially alkyl-etherified amine resin of which the methylol groups are not completely alkyl-etherified.

The water based coating composition of the present invention can be applied by any one of known coating methods such as a roll coating method, a brushing method, a spray coating method and an immersion method.

The water based coating composition of the present invention can be cured under wide baking conditions from baking approximately at 150° to 200° C. for 10 minutes to baking approximately at 250° C. for 10 seconds.

In the water based coating composition of the present invention, the above polyester resin having a free carboxyl group sufficiently reacts even with the above alkyl-etherified amino resin whose methylol groups are completely alkyl-etherified. Unlike a coating composition containing a sulfonic acid-containing acid catalyst, which is poor in water resistance, adhesion and impact resistance due to the acid catalyst, the water based coating composition of the present invention is excellent in these properties. Further, due to the use of the water based epoxy resin in combination, the water based coating composition of the present invention is excellent in hardness, impact resistance, water resistance, adhesion and shelf stability.

The present invention will be explained hereinafter by reference to Examples, in which "part" and "%" stand for "part by weight" and "% by weight".

PREPARATION EXAMPLE 1

Solution (A-1) of water-soluble polyester resin containing free carboxyl group:

A four-necked flask having a thermometer, a stirrer, a reflux condenser with a separation vessel and a nitrogen gas introducing tube was charged with 78.2 parts of neopentyl glycol, 22.4 parts of isophthalic acid and 13.2 parts of adipic acid. While the resultant mixture was stirred with introducing a nitrogen gas, the mixture was heated up to 200° to 220° C. and allowed to react until the reaction mixture showed an acid value of 5 or less. Then, the reaction mixture was cooled to 160° C., and 35.2 parts of trimellitic anhydride was added. The mixture was kept at 160° C. until it showed an acid value of 55, and cooled to 80° C. or lower. Then, 14.7 parts of butyl cellosolve, 10.7 parts of dimethylethanolamine and 48.2 parts of water were added to give a transparent viscous solution (A-1) having a solid content of 60%, and the water-soluble polyester resin had an acid value, before neutralization, of 55, a hydroxyl value of 230 and a weight average molecular weight of 3,000.

PREPARATION EXAMPLE 2

Solution (A-2) of water-soluble polyester resin containing free carboxyl group:

The same four-necked flask as that used in Example 1 was charged with 74.8 parts of neopentyl glycol, 15.9 parts of adipic acid and 29.7 parts of tetrahydrophthalic anhydride, and in the same manner as in Example 1, the resultant mixture was heated up to 200° to 220° C. and allowed to react until the reaction mixture showed an acid value of 5 or less. Then, the reaction mixture was cooled to 160° C. and 25.1 parts of trimellitic anhydride was added. The mixture was kept at 160° C. until the reaction mixture showed an acid value of 40. The reaction mixture was cooled to 80° C., and 15.2 parts of butyl cellosolve, 10.5 parts of dimethylethanolamine and 50.5 parts of water were added to give a transparent viscous solution (A-2) having a solid content of 60%, and the water-soluble polyester resin had an acid value, before neutralization, of 40, a hydroxyl value of 208 and a weight average molecular weight of 5,000.

PREPARATION EXAMPLE 3

Solution (A-3) of water-soluble polyester resin containing free carboxyl group:

The same four-necked flask as that used in Example 1 was charged with 70.3 parts of neopentyl glycol, 20.4 parts of adipic acid, 13.8 parts of phthalic anhydride and 25.1 parts of hexahydrophthalic anhydride, and in the same manner as in Example 1, the resultant mixture was heated up to 200° to 220° C. and allowed to react until the reaction mixture showed an acid value of 5 or less. Then, the reaction mixture was cooled to 160° C. and 13.4 parts of trimellitic anhydride was added. The mixture was kept at 160° C. until the reaction mixture showed an acid value of 25. The reaction mixture was cooled to 80° C., and 14.7 parts of butyl cellosolve, 10.3 parts of dimethylethanolamine and 48.3 parts of water were added to give a transparent viscous solution (A-2) having a solid content of 60%, and the water-soluble polyester resin had an acid value, before neutralization, of 25, a hydroxyl value of 162 and a weight average molecular weight of 10,000.

PREPARATION EXAMPLE 4

Solution (A-3) of water-soluble polyester resin containing free carboxyl group:

The same four-necked flask as that used in Example 1 was charged with 32.9 parts of diethylene glycol, 40.0 parts of neopentyl glycol, 19.7 parts of adipic acid and 20.0 parts of phthalic anhydride, and in the same manner as in Example 1, the resultant mixture was heated up to 200° to 220° C. and allowed to react until the reaction mixture showed an acid value of 5 or less. Then, the reaction mixture was cooled to 160° C. and 25.1 parts of pyromellitic anhydride was added. The mixture was kept at 160° C. until the reaction mixture showed an acid value of 30. The reaction mixture was cooled to 80° C. or lower, and 15.2 parts of butyl cellosolve, 9.9 parts of dimethylethanolamine and 51.1 parts of water were added to give a transparent viscous solution (A-4) having a solid content of 60 %, and the water-soluble polyester resin had an acid value, before neutralization, of 30, a hydroxyl value of 189 and a weight average molecular weight of 7,000.

PREPARATION EXAMPLE 5

Solution (A-5) of water-soluble polyester resin containing free carboxyl group:

The same four-necked flask as that used in Example 1 was charged with 42.4 parts of diethylene glycol, 28.8 parts of 1,4-butanediol, 17.5 parts of adipic acid and 12.3 parts of hexahydrophthalic anhydride, and in the same manner as in Example 1, the resultant mixture was heated up to 200° to 220° C. and allowed to react until the reaction mixture showed an acid value of 5 or less. Then, the reaction mixture was cooled to 160° C. and 42.0 parts of methylcyclohexenetricarboxylic anhydride was added. The mixture was kept at 160° C. until the reaction mixture showed an acid value of 45. The reaction mixture was cooled to 80° C., and 13.3 parts of butyl cellosolve, 10.3 parts of dimethylethanolamine and 43.1 parts of water were added to give a transparent viscous solution (A-5) having a solid content of 60%, and the water-soluble polyester resin had an acid value, before neutralization, of 45, a hydroxyl value of 218 and a weight average molecular weight of 4,000.

PREPARATION EXAMPLE 6

Solution (A-6) of water-soluble polyester resin containing hydroxy group:

The same four-necked flask as that used in Example 1 was charged with 65.1 parts of neopentyl glycol, 27.4 parts of isophthalic acid and 16.1 parts of adipic acid, and in the same manner as in Example 1, the resultant mixture was heated up to 200° to 220° C. and allowed to react until the reaction mixture showed an acid value of 5 or less. Then, the reaction mixture was cooled to 160° C. and 34.2 parts of tetrahydrophthalic arthydride was added. The mixture was kept at 160° C. until the reaction mixture silowed an acid value of 52. The reaction mixture was cooled to 80° C., and 14.1 parts of butyl cellosolve, 10.3 parts of dimethylethanolamine and 46.0 parts of water were added to give a transparent viscous solution (A-6) having a solid content of 60%, and the water-soluble polyester resin had an acid value, before neutralization, of 52, a hydroxyl value of 151 and a weight average molecular- weight of 2,000.

Table 1 shows the monomer compositions (unit: mol) for the polyester resins obtained in Examples 1 to 6.

TABLE 1

| | A-1 | A-2 | A-3 | A-4 | A-5 | A-6 |
|---|---|---|---|---|---|---|
| Neopentyl glycol | 1.85 | 1.65 | 1.45 | 1.00 | | 1.25 |
| Diethylene glycol | | | | 0.80 | 1.00 | |
| 1,4-Butanediol | | | | | 0.80 | |
| Adipic acid | 0.22 | 0.25 | 0.30 | 0.35 | 0.30 | 0.22 |
| Isophthalic acid | 0.33 | | | | | 0.33 |
| Phthalic anhydride | | | 0.20 | 0.35 | | |
| Tetrahydrophthalic anhydride | | 0.45 | | | | 0.45 |
| Hexahydrophthalic anhydride | | | 0.35 | | 0.20 | |
| Trimellitic anhydride | 0.45 | 0.30 | 0.15 | | | |
| Pyromellitic anhydride | | | | 0.30 | | |
| Methylcyclohexene-tricarboxylic anhydride | | | | | 0.50 | |

(Unit: mol)

PREPARATION EXAMPLE 7

Preparation of water based bisphenol type epoxy resin solution (B-1):

The same four-necked flask as that used in Example 1 was charged with 78.5 parts of bisphenol A diglycidyl ether type epoxy resin having an epoxy equivalent of 475 (EPIKOTE 1001, supplied by Shell Chemical Co.), 42.9 parts of butyl cellosolve, 21.5 parts of itaconic acid and 0.1 part of N,N-dimethylbenzoylamine. While the resultant mixture was stirred with introducing a nitrogen gas, the mixture was heated up to 120° C. When the reaction mixture showed an acid value of 93, the reaction was terminated. The reaction mixture was cooled to 80° C. or lower, and 14.7 parts of dimethylethanolamine and 42 parts of water were added to give a transparent viscous solution (B-1) having a sol id content of 50%, and the so-obtained water based epoxy resin had an acid value, before neutralization, of 93 and a hydroxyl value of 208.

EXAMPLE 1

75 Parts of the polyester resin solution (A-1), 5 parts of the epoxy resin solution (B-1), 20 parts of a completely alkyl-etherified amino resin (CYMEL 303, trade name, supplied by Mitsui Cyanamid Co.), 85 parts of water and 10 parts of butyl cellosolve were mixed to give a coating composition having a solid content of 40%.

EXAMPLES 2 and 3

Coating composition were obtained from the materials shown in Table 2 in amounts shown in Table 2 in the same manner as in Example 1.

EXAMPLE 4

70 Parts of the polyester resin solution (A-2), 10 parts of the epoxy resin solution (B-1), 20 parts of a partially alkyl-etherified amino resin (CYMEL 370, trade name, supplied by Mitsui Cyanamid Co.), 79 parts of water and 5.7 parts of butyl cellosolve were mixed to give a coating composition having a solid content of 40%.

EXAMPLE 5

Example 4 was repeated except that the polyester resin solution was replaced with A-3 to give a coating composition.

EXAMPLES 6 and 7

Coating compositions were obtained from either A-4 or A-5, the epoxy resin solution (B-1), CYMEL 303, butyl cellosolve and water in amounts shown in Table 2 in the same manner as in Example 1.

COMPARATIVE EXAMPLE 1

65 Parts of the polyester resin solution (A-1), 35 parts of CYMEL 303, 10 parts of butyl cellosolve and 102 parts of water were mixed (without the epoxy resin solution (B-1)) to give a coating composition.

COMPARATIVE EXAMPLES 2-4

Coating compositions were prepared from the polyester resin solution (A-6), the epoxy resin solution (B-1), either CYMEL 303 or CYMEL 370, butyl cellosolve and water in amounts shown in Table 2. In Comparative Example 4, 0.5 part of p-toluenesulfonic acid was also added.

Each of the coating compositions obtained in Examples 1 to 7 and Comparative Examples 1 to 4 was roll-coated on an electrically plated tin plate and baked in a gas oven at 200° C. for 4 minutes to give coated panels having a 7 μm thick coating. The coated panels were tested by the following test methods, and Table 2 shows the results.

Test Methods (1) Solvent resistance

An absorbent cotton wet with methyl ethyl ketone was manually rubbed against the coated panels repeatedly, and the solvent resistance was expressed by the number of repetition of rubbing which the coating withstood without being peeled.

(2) Pencil hardness

The coated panels were measured according to the method described in the pencil scratching test (JIS K5400).

(3) Impact resistance

A du Pont impact tester was used, and while an impacter having a diameter of ½ inch was kept in contact with a sample, a weight of 500 g was dropped on the impacter. A sample was evaluated on its impact resistance on the basis of a height at which no crack occurred.

(4) Water resistance

A coated panel was immersed in boiling water for 30 minutes, and a whitened state of the coating was observed.

(5) Adhesion after test on water resistance

The coated panels which had been subjected to the water resistance test were cross-cut with a knife and subjected to a peel test with a Cellophane tape. Peeled areas are expressed by percentage.

TABLE 2

| | Example | | | | | | |
|---|---|---|---|---|---|---|---|
| | 1 | 2 | 3 | 4 | 5 | 6 | 7 |
| Polyester resin | | | | | | | |
| solution A-1 | 75 | 65 | 55 | | | | |
| solution A-2 | | | | 70 | | | |
| solution A-3 | | | | | 65 | | |
| solution A-4 | | | | | | 55 | |
| solution A-5 | | | | | | | 50 |
| solution A-6 | | | | | | | |
| Epoxy resin | | | | | | | |
| solution B-1 | 5 | 5 | 5 | 10 | 20 | 5 | 15 |
| Amino resin | | | | | | | |
| Cymel 303 | 20 | 30 | 40 | | | 40 | 30 |
| Cymel 370 | | | | 20 | 15 | | |
| Butyl cellosolve | 10 | 10 | 10 | 10 | 10 | 10 | 10 |
| Water | 85 | 92 | 98 | 75 | 71 | 98 | 97 |
| p-Toluene-sulfonic acid | | | | | | | |
| Solvent resistance | 80 | 90 | 100< | 100< | 80 | 100< | 90 |
| Pencil hardness | 3H | 3H | 4H | 4H | 3H | 4H | 3H |
| Impact resistance (cm) | 50 | 50 | 40 | 40 | 50 | 40 | 50 |
| Water resistance | good | good | good | good | good | good | good |
| Adhesin (%) | 0 | 0 | 0 | 0 | 0 | 0 | 0 |

| | Comparative Example | | | |
|---|---|---|---|---|
| | 1 | 2 | 3 | 4 |
| Polyester resin | | | | |
| solution A-1 | 65 | | | |
| solution A-2 | | | | |
| solution A-3 | | | | |
| solution A-4 | | | | |
| solution A-5 | | | | |
| solution A-6 | | 75 | 65 | 55 |
| Epoxy resin | | | | |
| solution B-1 | | 5 | 10 | 10 |
| Amino resin | | | | |
| Cymel 303 | 35 | 20 | | 35 |
| Cymel 370 | | | 25 | |
| Butyl cellosolve | 10 | 10 | 10 | 10 |
| Water | 102 | 85 | 59 | 50 |
| p-Toluene-sulfonic acid | | | | 0.5 |
| Solvent resistance | 90 | 2 | 30 | 100< |
| Pencil hardness | 2H | HB | H | 4H |
| Impact resistance (cm) | 20 | 50 | 50 | 20 |
| Water resistance | good | whitened | whitened | good |
| Adhesin (%) | 100 | 30 | 10 | 80 |

What is claimed is:

1. A curing catalyst-free water based coating composition obtained by dissolving or dispersing 50 to 80 % by weight, as a solid content, of a water-soluble polyester resin prepared by polycondensing a carboxylic acid component containing 10 to 60 mol % of polycarboxylic acid having 3 to 4 carboxyl groups per molecule and 40 to 90 mol % of a dicarboxylic acid and 1.1 to 2.0 mol %, per mole of the carboxylic acid component, of a glycol component, to obtain a polyester resin having a free carboxyl group and a weight average molecular weight of 1,000 to 15,000, and dissolving the polyester resin in water in the presence of a base, 5 to 20% by weight, as a solid content, of a water based bisphenol epoxy resin, and 15 to 45% by weight, as a solid content, of an alkyletherified amino resin, in an aqueous medium.

2. A coating composition according to claim 1, wherein the polycarboxylic acid is an acid anhydride in which part of all of the hydroxyl groups are dehydrated.

3. A coating composition according to claim 1, wherein the water based bisphenol type epoxy resin is a product prepared by adding a polycarboxylic acid to a bisphenol epoxy resin and dispersing or dissolving the resultant addition product in an aqueous medium in the presence of a base.

4. A coating composition according to claim 1, wherein the bisphenol epoxy resin has a number average molecular weight of 500 to 5,000.

5. A coating composition according to claim 1, wherein the alkyl-etherified amino resin is an amino resin prepared by alkyl-etherifying methylol groups added to a melamine resin or a benzoguanamine resin.

6. A coating composition according to claim 1, wherein the aqueous medium is prepared from water and not more than 20% by weight, based on the water, of a hydrophilic organic solvent.

* * * * *

UNITED STATES PATENT AND TRADEMARK OFFICE
CERTIFICATE OF CORRECTION

PATENT NO. : 5,344,857
DATED : September 6, 1994
INVENTOR(S) : MITUO UMEZAWA, MASASHI NAKAMURA and HIROSI KUBOTA It is certified that error appears in the above-indentified patent and that said Letters Patent is hereby corrected as shown below:

Column 9, line 4, before "polycarboxylic" insert —a—;

line 6, delete the symbol "Z".

Signed and Sealed this

Fourteenth Day of February, 1995

Attest:

BRUCE LEHMAN

Attesting Officer    Commissioner of Patents and Trademarks